(12) United States Patent
Gumaste et al.

(10) Patent No.: US 7,450,851 B2
(45) Date of Patent: Nov. 11, 2008

(54) SYSTEM AND METHOD FOR MODULARLY SCALABLE ARCHITECTURE FOR OPTICAL NETWORKS

(75) Inventors: Ashwin Anil Gumaste, Richardson, TX (US); Daniel Bihon, Plano, TX (US)

(73) Assignee: Fujitsu Limited, Kawasaki (JP)

( * ) Notice: Subject to any disclaimer, the term of this patent is extended or adjusted under 35 U.S.C. 154(b) by 663 days.

(21) Appl. No.: 10/928,434

(22) Filed: Aug. 27, 2004

(65) Prior Publication Data

US 2006/0045528 A1 Mar. 2, 2006

(51) Int. Cl.
*H04B 10/00* (2006.01)
(52) U.S. Cl. .............................. 398/83; 398/82; 398/85
(58) Field of Classification Search .............. 398/82–87
See application file for complete search history.

(56) References Cited

U.S. PATENT DOCUMENTS

| | | | |
|---|---|---|---|
| 5,323,258 A | 6/1994 | Tsushima et al. | 359/190 |
| 5,483,372 A | 1/1996 | Green, Jr. | 359/173 |
| 5,510,920 A | 4/1996 | Ota | 359/121 |

(Continued)

FOREIGN PATENT DOCUMENTS

EP        0 920 153 A2    6/1999

(Continued)

OTHER PUBLICATIONS

Boskovic et al., "Broadcast and Select OADM Nodes Application and Performance Trade-offs," OFC, pp. 158-159, 2002.

(Continued)

*Primary Examiner*—Agustin Bello
(74) *Attorney, Agent, or Firm*—Baker Botts L.L.P.

(57) ABSTRACT

A system and method for modularly scalable architecture for optical networks are provided. In one embodiment, a node for an optical network comprises a plurality of in-line switches connected to an optical ring and operable in a first state to both pass an optical signal received from the optical ring to an associated coupler and pass an optical signal received from the associated coupler to the optical ring. The optical signal carries traffic in a plurality of channels. A drop coupler is coupled to a first in-line switch and is operable to receive an optical signal from the in-line switch where the switch is in the first state, pass a first copy of the optical signal back to the in-line switch for passing to the optical ring, and drop a second copy of the optical signal to a distributing element. The distributing element is operable to receive the second copy and pass traffic in one or more channels of the second copy. A filter is operable to reject one or more channels of the first copy to generate a passthrough signal. A combining element is operable to receive traffic in one or more channels to be added to the optical ring and combine the received traffic to generate an add signal. An add coupler is coupled to a second in-line switch and is operable to receive the passthrough signal from the second in-line switch when the switch is in the first state, add the add signal to the passthrough signal to generate a combined signal, and pass the combined signal to the second in-line switch for passing to the optical ring.

26 Claims, 6 Drawing Sheets

U.S. PATENT DOCUMENTS

| | | | |
|---|---|---|---|
| 5,550,818 A | 8/1996 | Brackett et al. | 370/60 |
| 5,576,875 A | 11/1996 | Chawki et al. | 359/125 |
| 5,748,811 A | 5/1998 | Amersfoort et al. | 385/15 |
| 5,771,112 A | 6/1998 | Hamel et al. | 359/128 |
| 5,774,606 A | 6/1998 | de Barros et al. | 385/24 |
| 5,778,118 A | 7/1998 | Sridhar | 385/24 |
| 5,903,371 A | 5/1999 | Arecco et al. | 359/119 |
| 5,905,838 A | 5/1999 | Judy et al. | 385/123 |
| 5,956,319 A | 9/1999 | Meli | 370/224 |
| 5,959,749 A | 9/1999 | Danagher et al. | 359/124 |
| 5,999,291 A | 12/1999 | Anderson | 359/133 |
| 6,025,941 A | 2/2000 | Srivastava et al. | 359/119 |
| 6,028,898 A | 2/2000 | Sparks et al. | 375/317 |
| 6,038,045 A | 3/2000 | Sotom et al. | |
| 6,038,357 A | 3/2000 | Pan | 385/24 |
| 6,040,933 A | 3/2000 | Khaleghi et al. | 359/124 |
| 6,101,012 A | 8/2000 | Danagher et al. | 359/127 |
| 6,115,156 A | 9/2000 | Otani et al. | 359/124 |
| 6,125,220 A | 9/2000 | Copner et al. | 385/27 |
| 6,134,036 A * | 10/2000 | Andreozzi et al. | 398/1 |
| 6,151,356 A | 11/2000 | Spagnoletti et al. | 375/226 |
| 6,160,648 A | 12/2000 | Oberg et al. | 359/110 |
| 6,160,660 A | 12/2000 | Aina et al. | 359/341 |
| 6,163,527 A | 12/2000 | Ester et al. | 370/228 |
| 6,166,838 A | 12/2000 | Liu et al. | 359/128 |
| 6,172,801 B1 | 1/2001 | Takeda et al. | 359/337 |
| 6,181,849 B1 | 1/2001 | Lin et al. | 385/24 |
| 6,188,816 B1 | 2/2001 | Solheim | 385/24 |
| 6,192,172 B1 | 2/2001 | Fatehi et al. | 385/17 |
| 6,192,173 B1 | 2/2001 | Solheim et al. | 385/24 |
| 6,201,909 B1 | 3/2001 | Kewitsch et al. | 385/37 |
| 6,205,158 B1 | 3/2001 | Martin et al. | 370/541 |
| 6,208,440 B1 | 3/2001 | Jang | 359/127 |
| 6,222,654 B1 | 4/2001 | Frigo | 359/119 |
| 6,226,117 B1 | 5/2001 | Hentschel | 359/337 |
| 6,236,499 B1 | 5/2001 | Berg et al. | 359/341 |
| 6,243,517 B1 | 6/2001 | Deacon | 385/50 |
| 6,249,510 B1 | 6/2001 | Thompson | 370/223 |
| 6,268,951 B1 | 7/2001 | Chen et al. | 359/279 |
| 6,275,331 B1 | 8/2001 | Jones et al. | 359/341.44 |
| 6,285,479 B1 | 9/2001 | Okazaki et al. | 359/133 |
| 6,288,834 B1 | 9/2001 | Sugaya et al. | 359/341.1 |
| 6,298,038 B1 | 10/2001 | Martin et al. | 370/216 |
| 6,331,906 B1 | 12/2001 | Sharma et al. | 359/119 |
| 6,337,755 B1 | 1/2002 | Cao | 359/176 |
| 6,351,323 B1 | 2/2002 | Onaka et al. | |
| 6,363,183 B1 | 3/2002 | Koh | 385/19 |
| 6,400,476 B1 | 6/2002 | Arecco | 359/110 |
| 6,445,850 B1 | 9/2002 | Zhou et al. | 385/24 |
| 6,519,064 B1 | 2/2003 | Fatehi et al. | 359/130 |
| 6,529,303 B1 | 3/2003 | Rowan et al. | 359/128 |
| 6,590,681 B1 | 7/2003 | Egnell et al. | 359/127 |
| 6,597,481 B1 | 7/2003 | Fatehi et al. | |
| 6,643,042 B1 | 11/2003 | Nishio et al. | |
| 6,674,935 B2 * | 1/2004 | Kelly et al. | 385/24 |
| 6,751,375 B1 | 6/2004 | Meyer | |
| 6,931,175 B2 * | 8/2005 | Bock et al. | 385/24 |
| 2002/0030866 A1 | 3/2002 | Wu et al. | 359/122 |
| 2002/0048066 A1 | 4/2002 | Antoniades et al. | 359/128 |
| 2002/0067523 A1 | 6/2002 | Way | 359/119 |
| 2002/0094155 A1 | 7/2002 | Sakano | |
| 2002/0101633 A1 | 8/2002 | Onaka et al. | |
| 2002/0145779 A1 | 10/2002 | Strasser et al. | 359/124 |
| 2002/0159117 A1 | 10/2002 | Nakajima et al. | |
| 2002/0191899 A1 | 12/2002 | Kelly et al. | 385/24 |
| 2003/0091274 A1 | 5/2003 | Vohra et al. | 385/24 |
| 2003/0215232 A1 | 11/2003 | Jahn et al. | 398/41 |
| 2003/0223682 A1 | 12/2003 | Kinoshita et al. | 385/24 |
| 2004/0052530 A1 | 3/2004 | Tian et al. | 398/83 |

FOREIGN PATENT DOCUMENTS

| | | |
|---|---|---|
| EP | 0 949 777 A2 | 10/1999 |
| EP | 1 014 613 A2 | 6/2000 |
| EP | 1 231 728 A2 | 8/2002 |
| JP | 2002-304421 | 12/1990 |
| JP | 03-053226 | 3/1991 |
| JP | 09-102991 | 4/1997 |
| JP | 09-329815 | 12/1997 |
| JP | 11-055268 | 2/1999 |
| JP | 11-289296 | 10/1999 |
| JP | 2000-244953 | 9/2000 |
| JP | 2000-271272 | 10/2000 |
| JP | 2002-208895 | 7/2002 |
| JP | 2002-214473 | 7/2002 |
| WO | WO 98/47255 | 10/1998 |
| WO | WO 99/65164 | 12/1999 |
| WO | WO 02/073856 | 9/2002 |

OTHER PUBLICATIONS

Batchello, "Optical Networking the Ericsson Way," *Ericsson Limited, Business Unit Transport and Cable Networks*, Feb. 22, 2002, 4 pages.

Chan et al., "Optical Distribution Networks," OptiComm 2000: Optical Networking and Communications, *Proceedings of SPIE*, vol. 4233, Oct. 2000, 12 pages.

Chan and Serena Chan, "Optical distribution networks," *Optical Networks Magazine*, Jan./Feb. 2002, 9 pages.

Grenfeldt, "ERION—Ericsson optical networking using WDM technology," *Ericsson Review*, No. 3, 1998, 6 pages.

Goldstein, "Optical Ring Networks with Distributed Amplification," *IEEE Photonics Technology Letters*, vol. 3, No. 4, Apr. 1991, 4 pages.

Gerstel of Nortel Networks, "Optical Layer Survivability," Tutorial T4, slides of OMS DPRing: Flexing Bus and Pros/Con of Flexing Bus, OptiComm 2000, *Conference on Optical Communications and Networking*, Oct. 2000, 2 pages.

Kinoshita et al., "Flexible Twin Open Ring Metro WDM Network," OECC, pp. 713-714, Oct. 2003.

Kinoshita et al. "Flexible Metro WDM Network with Photonic Domains", Fujitsu Laboratories of America, Inc., 3 pages, Feb. 24-26, 2004.

Martin, Chiroll Tolliver, Jerome Case, Marcus W. Shute, Sr., and Z. Y. Gills, "A Flexible Broadband Wavelength Multiplexer," *Proceedings of SPIE*, vol. 4532, 2001, 12 pages, 2000.

Mookherjea, "Remotely Pumped Optical Distribution Networks: A Distributed Amplifier Model," *Journal of Lightwave Technology*, vol. 19, No. 7, Jul. 2001, 7 pages.

Suzuki et al., "Prototype of 12.5GHz-Spaced Tapped-Type OADM for DWDM Metro Ring Networks," ECOC-IOOC Proceedings—vol. 4, pp. 903-903, Sep. 21-25, 2003.

Tian et al., "OUPSR Protected Flexible Metro WDM Network," ECOC, pp. 826-827, 2003.

Wolde, J., et al., "Optical Ethernet Metro Access Network Protype: Implementation and Results," ECOC-IOOC 2003, 3 pages, Sep. 21-25, 2003.

Communication from the European Patent Office, European Search Report for Application No. EP 05 017499.4, Mar. 3, 2006, 14 pages.

Communication from the European Patent Office, European Search Report for Application No. EP 05 017499.4, Dec. 19, 2005, 6 pages.

Communication from the European Patent Office, European Search Report for Application No. EP 05 017499.4, Mar. 19, 2008, 4 pages.

Untranslated Office Action for Japanese Patent Application No. 2005-2403067, Received Jun. 17, 2008, pp. 1-6.

Partially Translated Office Action for Japanese Patent Application No. 2005-2403067, Received Jun. 17, 2008, pp. 1-5.

Shinji, "High-Performance Optical Branching and Inserting Unit and Wavelength Multiplex Optical Network," Patent Abstracts of Japan, Translated Publication No. 2002-214473, 1 page.

Hideaki et al., "Optical Node," Patent Abstracts of Japan, Translation of Japanese Patent Application No. 02-304421, 1 page.

Hiroshi et al., "Optical Transmission Equipment, Optical Transmission System and Optical Terminal Station," Patent Abstracts of Japan, Translation of Japanese Patent Application No. 11-289296, 1 page, Oct. 19, 1999.

Ichiro et al., "Optical Add/Drop Device," Patent Abstracts of Japan, Translation of Japanese Patent Application No. 2002-208895, 1 page, Jul. 26, 2002.

Makoto, "Optical Communication Network Node," Patent Abstracts of Japan, Translation of Japanese Patent Application No. 11-055268, 1 page, Feb. 26, 1999.

Makoto, "Optical Branch/Insertion Node," patent Abstracts of Japan, Translation of Japanese Patent Application No. 03-053226, 1 pages, Mar. 7, 1991.

Mohammed et al., "Controllable Wavelength Selecting Optical Cross Connect," Patent Abstracts of Japan, Translation of Japanese Patent Application No. 2000-244953, 1 page, Sep. 8, 2000.

Takashi, "Add/Drop Method and Synchronizing Method," Patent Abstracts of Japan, Translation of Japanese Patent Application No. 09-102991, 1 page, Apr. 15, 1997.

Kiyoharu et al., "Optical Data Way,", Patent Abstracts of Japan, Translation of Japanese Patent Application No. 60-158742, 1 page, Aug. 20, 1985.

Yuji et al. "Pachinko Machine," Patent Abstracts of Japan, Translation of Japanese Patent Application No. 2000-271272, 1 page, Oct. 3, 2000.

Hideaki, "Wavelength Selecting Node," Patent Abstracts of Japan, Translation of Japanese Patent Application No. 09-329815, 1 page, Dec. 22, 1997.

* cited by examiner

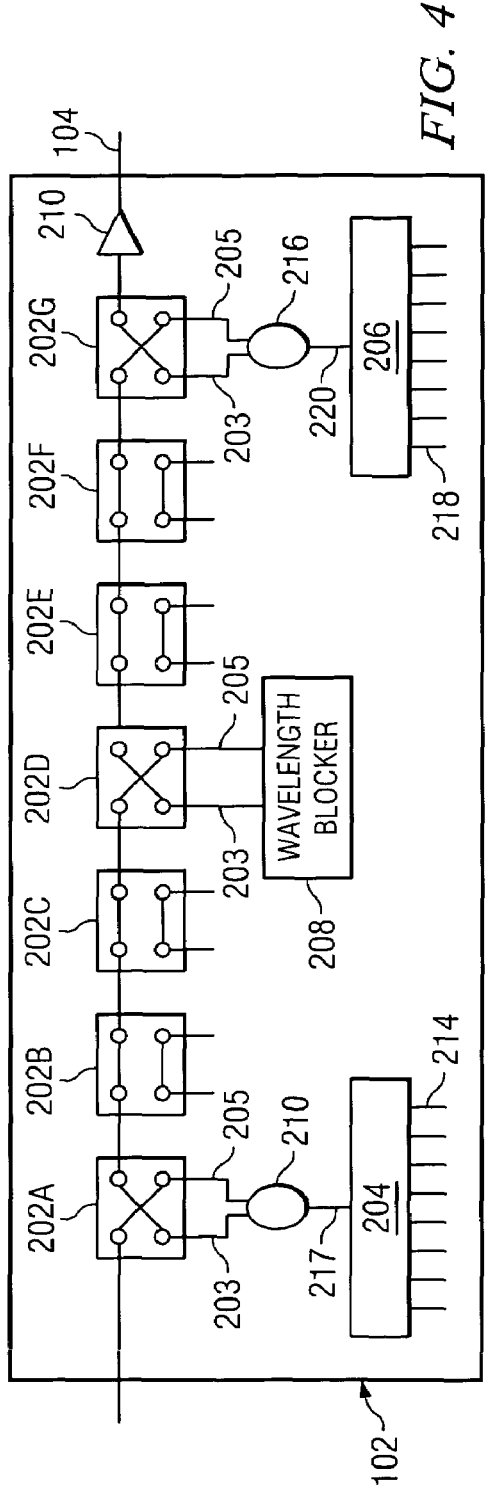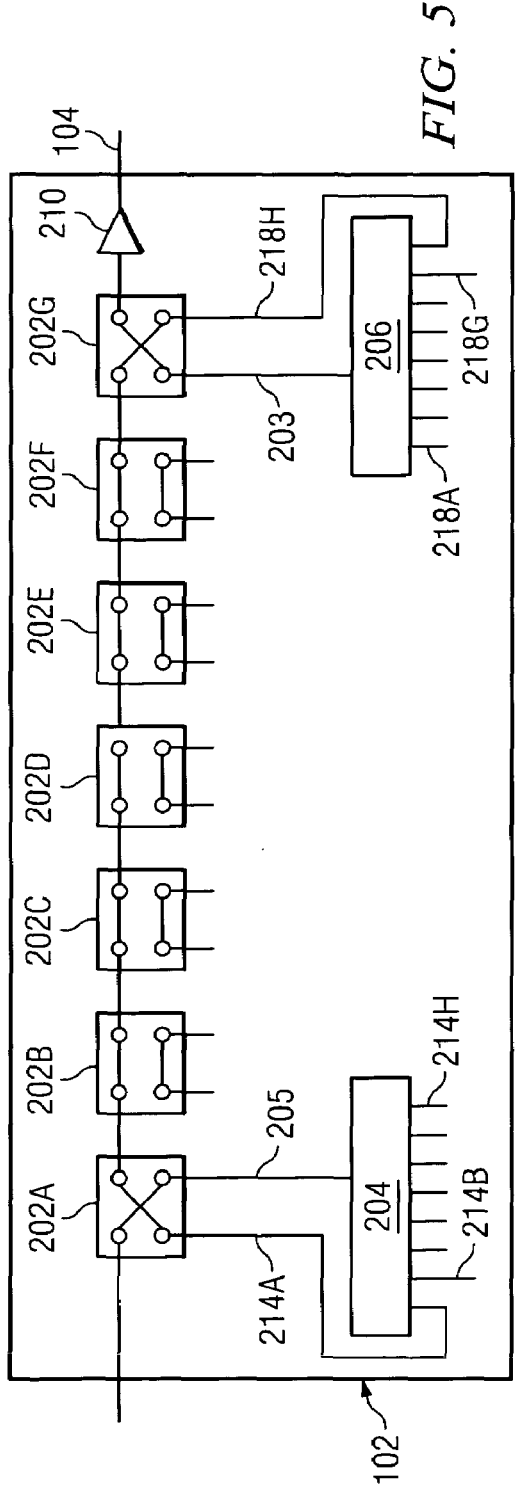
FIG. 4
FIG. 5

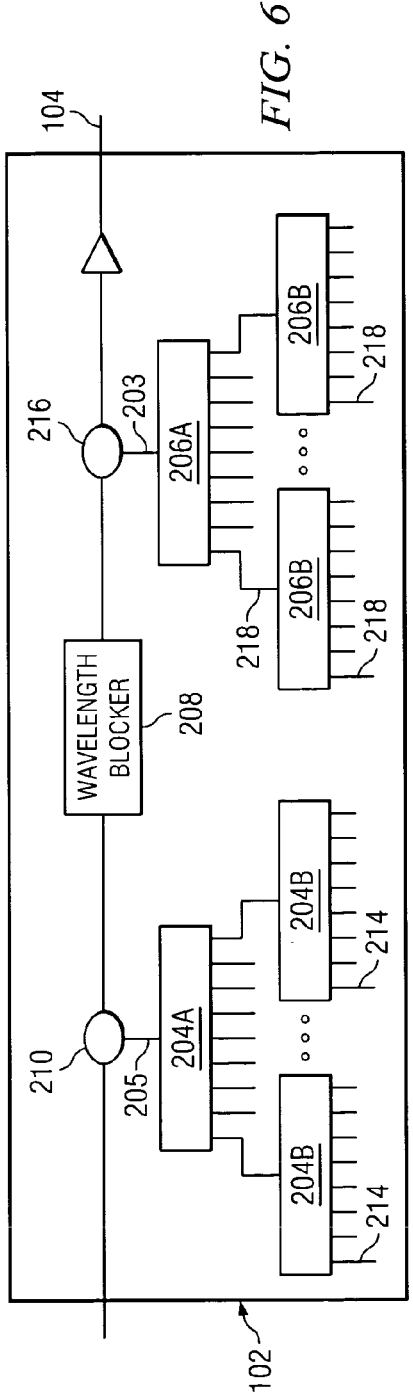
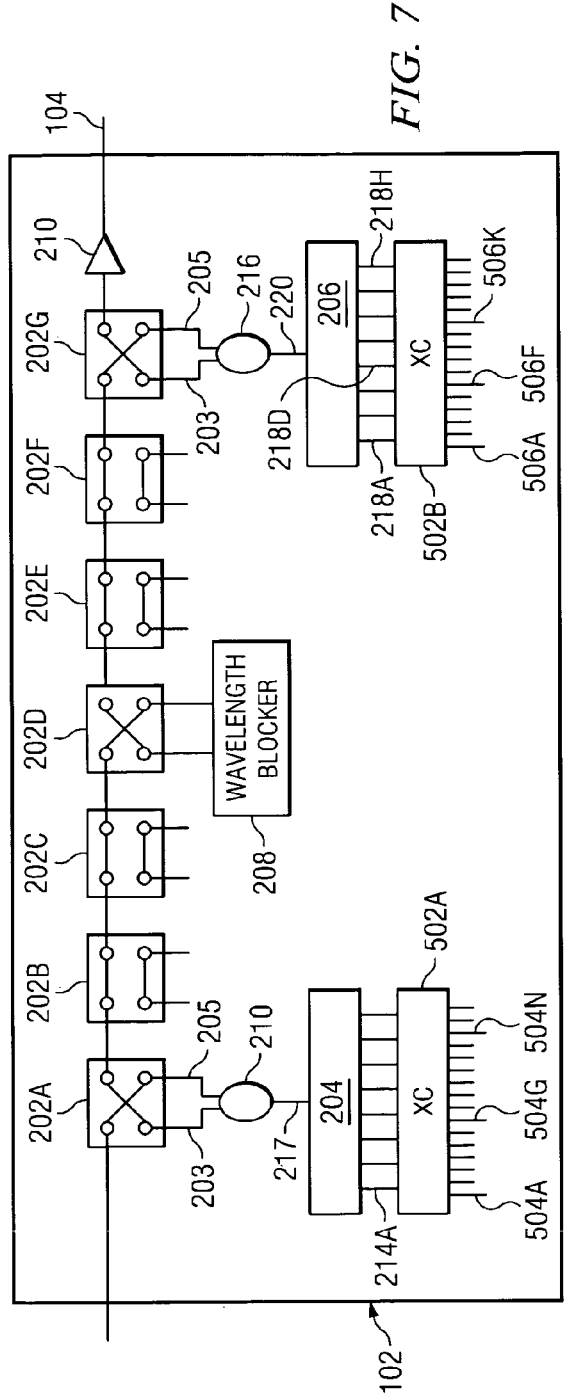

SYSTEM AND METHOD FOR MODULARLY SCALABLE ARCHITECTURE FOR OPTICAL NETWORKS

TECHNICAL FIELD

The present invention relates generally to optical networks, and more particularly to a system and method for modularly scalable architecture for optical networks.

BACKGROUND

Telecommunications systems, cable television systems and data communication networks use optical networks to rapidly convey large amounts of information between remote points. In an optical network, information is conveyed in the form of optical signals through optical fibers. Optical fibers are thin strands of glass capable of transmitting the signals over long distances with very low loss.

Optical networks often employ wavelength division multiplexing (WDM) or dense wavelength division multiplexing (DWDM) to increase transmission capacity. In WDM and DWDM networks, a number of optical channels are carried in each fiber at disparate wavelengths. Network capacity is based on the number of wavelengths, or channels, in each fiber and the bandwidth of the channels. In WDM, DWDM and other optical networks, micro-electro-mechanical switches (MEMS), arrayed waveguide gratings (AWGs), interleavers, and/or fiber gratings (FGs) are typically used to add and drop traffic at network nodes and to multiplex and demultiplex traffic in various channels at network nodes.

SUMMARY

A system and method for modularly scalable architecture for optical networks are provided. In one embodiment, a node for an optical network comprises a plurality of in-line switches connected to an optical ring and operable in a first state to both pass an optical signal received from the optical ring to an associated coupler and pass an optical signal received from the associated coupler to the optical ring. The optical signal carries traffic in a plurality of channels. A drop coupler is coupled to a first in-line switch and is operable to receive an optical signal from the in-line switch where the switch is in the first state, pass a first copy of the optical signal back to the in-line switch for passing to the optical ring, and drop a second copy of the optical signal to a distributing element. The distributing element is operable to receive the second copy and pass traffic in one or more channels of the second copy. A filter is operable to reject one or more channels of the first copy to generate a passthrough signal. A combining element is operable to receive traffic in one or more channels to be added to the optical ring and combine the received traffic to generate an add signal. An add coupler is coupled to a second in-line switch and is operable to receive the passthrough signal from the second in-line switch when the switch is in the first state, add the add signal to the passthrough signal to generate a combined signal, and pass the combined signal to the second in-line switch for passing to the optical ring.

Technical advantages of certain embodiments of the present invention include providing a plurality of in-line switches in a network element to provide a scalable architecture. For example, a network node may begin as an in-line amplification site and be upgraded to an add/drop node via the in-line switches. Further upgrading may increase the capacity of the add/drop node or allow it to be used to interface between different networks. As a result of the scaleable nature, the node has a low entry cost and may allow in-service upgrades. Other advantages of one or more embodiments may include reducing, minimizing or eliminating uncertainty in switching by deploying digital cross connects using wavelength clustering, and the digital cross connects may also provide sub-lambda granularity. One or more embodiments may also have the advantage of increasing reliability of wavelength-selective switch technology.

BRIEF DESCRIPTION OF THE DRAWINGS

FIG. 4 is a block diagram illustrating details of a node of FIG. 1 in accordance with another embodiment of the present invention;

FIG. 5 is a block diagram illustrating details of a node of FIG. 1 in accordance with another embodiment of the present invention;

FIG. 6 is a block diagram illustrating details of a node of FIG. 1 in accordance with another embodiment of the present invention;

FIG. 7 is a block diagram illustrating details of a node of FIG. 1 including cross connects in accordance with yet another embodiment of the present invention.

DETAILED DESCRIPTION OF THE DRAWINGS

Figure 1:
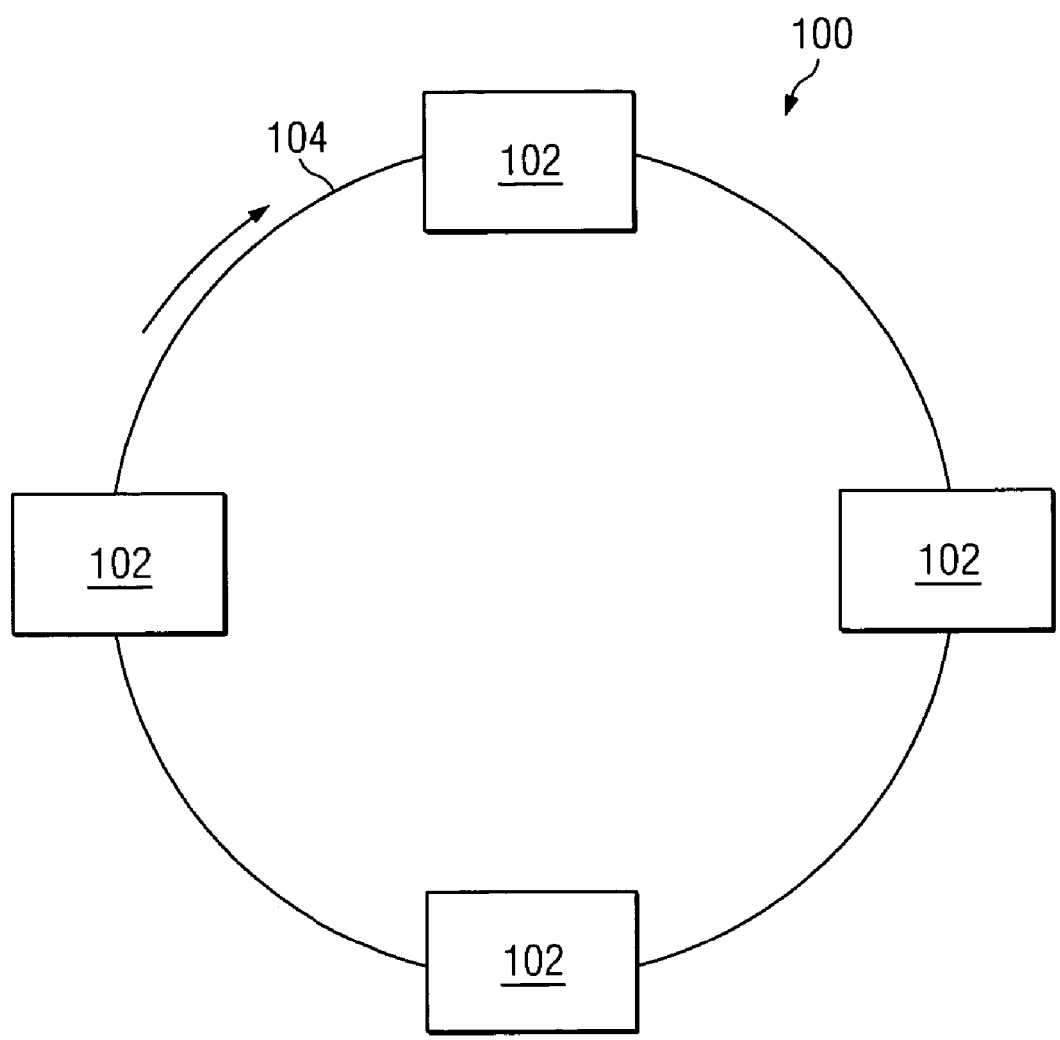
FIG. 1 is a block diagram illustrating an optical network in accordance with one embodiment of the present invention.

FIG. 1 illustrates an optical network 100 in accordance with one embodiment of the present invention. In this embodiment, the network 100 is an optical network in which a number of optical channels are carried over a common path at disparate wavelengths. The network 100 may be a wavelength division multiplexing (WDM), dense wavelength division multiplexing (DWDM), or other suitable multi-channel network. The network 100 may be used in a short-haul metropolitan network, a long-haul inter-city network, or any other suitable network or combination of networks.

Network 100 includes a plurality of add/drop nodes 102 and a fiber optic ring 104. In the illustrated embodiment, an optical signal is transmitted in a clockwise direction on the ring 104. "Optical signal", as used herein, is a signal that includes multiple channels that are each associated with a particular wavelength or a band of wavelengths and that carry traffic in network 100. As used herein, "traffic" means information transmitted in a channel. Ring 104 optically connects nodes 102, wherein each node 102 can both transmit traffic to and receive traffic from the other nodes 201. As used herein, the term "each" means every one of at least a subset of the identified items. Optical signals transmitted in network 100 may have at least one characteristic modulated to encode audio, video, textual, real-time, non-real-time and/or other suitable data. Modulation may be based on phase shift keying (PSK), intensity modulation (IM) and other suitable methodologies. Although FIG. 1 illustrates a single-ring network, embodiments of the invention may be used in any appropriate type of ring network or other type of optical network and may be implemented in any suitable device in such networks.

In the illustrated embodiment, nodes 102 are each operable to add and drop traffic to and from ring 104. At each node 102, traffic received from local clients is added to ring 104, while traffic destined for local clients is dropped from ring 104. Traffic may be added to ring 104 by inserting the traffic in one or more channels into the optical signal. Traffic may be dropped from ring 104 by making the traffic available for transmission to the local clients. Thus, traffic may be dropped and yet continue to circulate on ring 104. In particular embodiments, traffic is passively added to and dropped from ring 104. "Passive" in this context means the adding or dropping of channels without power, electricity, and/or moving parts. An active device would thus use power, electricity or moving parts to perform work. In particular embodiments, traffic may be passively added to and/or dropped from ring 104 by splitting traffic from and combining traffic with the optical signal carried around ring 104 without demultiplexing the optical signal. In an alternative embodiment of adding and dropping traffic, the nodes 102 may multiplex traffic from local clients in multiple channels for transmittal in ring 104 and may demultiplex traffic in multiple channels of the optical signal on ring 104 for clients.

Figure 2A:
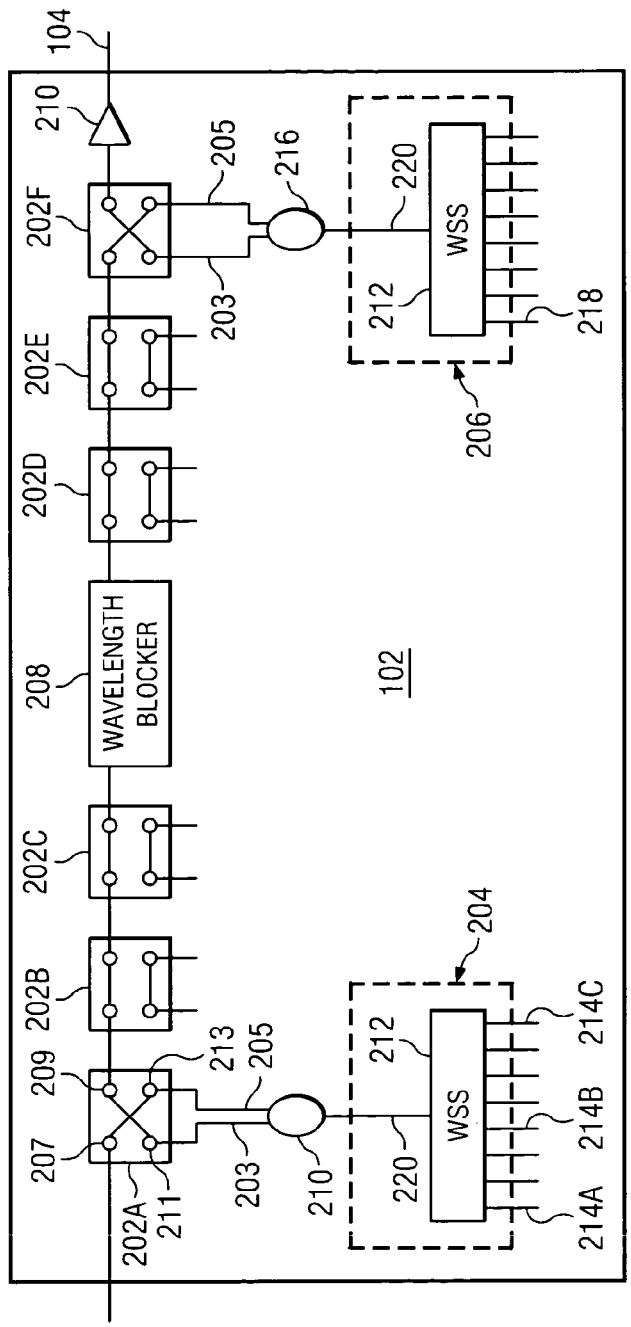
FIG. 2A is a block diagram illustrating details of a node of FIG. 1 in accordance with one embodiment of the present invention.

FIG. 2A illustrates a local node 102 of FIG. 1 in accordance with one embodiment of the present invention. In the illustrated embodiment, node 102 includes in-line switches 202 and a distributing element 204 to extract traffic in one or more channels destined for node 102 from an optical signal carried on ring 104. As used herein, "in-line" means directly connected to ring 104. In addition, node 102 uses in-line switches 202 and a combining element 206 to add traffic in one or more channels to the optical signal carried on ring 104. Also, node 102 uses a wavelength blocker 208 to reject particular channels from the optical signal carried on ring 104.

In particular embodiments, the various elements of node 102 may each be implemented as a discreet card and interconnected through a backplane of a card shelf of node 102. Alternatively, the functionality of the elements of node 102 may be distributed across a plurality of discreet cards. The elements of node 102 may be coupled by direct, indirect, or other suitable connection or association. In the illustrated embodiment, the elements of node 102 are connected with optical fiber connections; however, other embodiments may be implemented in part or otherwise with planer waveguide circuits and/or free space optics.

Each in-line switch 202 is operable to selectively switch an optical signal carried in ring 104 to an associated coupler 210 or 216. In the illustrated embodiment, each in-line switch 202 comprises a 2×2 switch with a first input port 207 and a first output port 209 connected to ring 104. When an in-line switch 202 is in an open state, the first input port 207 is connected to the first output port 209 and thus the optical signal carried on ring 104 passes through the in-line switch 202 in an open state without passing through an associated coupler 210 or 216, as illustrated in in-line switches 202B to E. Each in-line switch 202 also includes a second input port 211 and a second output port 213 connected to an egress lead 203 and an ingress lead 205, respectively. When an in-line switch 202 is in a cross state, first input port 207 is connected to second output port 213 thus connecting ring 104 to ingress lead 205 of an associated coupler 210 or 216, and second input port 211 is connected to first output port 209 thus connecting egress lead 203 of an associated coupler 210 or 216 to ring 104.

Drop coupler 210 is operable to split the optical signal into two substantially identical signals and drops one signal to drop lead 217 and pass the other signal to egress lead 203. As used herein, an optical coupler is any device operable to combine or otherwise generate a combined optical signal based on two or more optical signals and/or to split or divide an optical signal into discrete optical signals. The discrete signals may be similar or identical in frequency, form, and/or content. For example, the discrete signals may be identical in content and identical or substantially similar in power, may be identical in content and differ substantially in power, or may differ slightly or otherwise in content. Any other suitable optical devices that passively splits an input signal into two substantially identical signals may be used in place of drop coupler 210. In the illustrated embodiment, drop coupler 210 comprises a 1×2 coupler that passes the optical signal to ring 104 via egress lead 203 and also drops the optical signal to a wavelength-selective switch (WSS) 212.

Figure 2C:
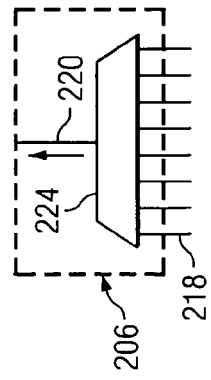
FIGS. 2B and 2C are block diagrams of distributing element and combining element of FIG. 2A in accordance with one embodiment of the present invention.
Figure 2B:
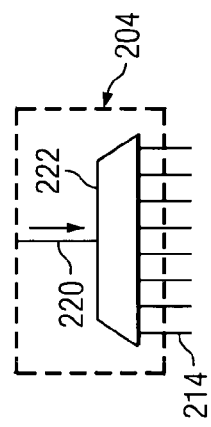

WSS 212 is operable to optically switch one or more individual channels of the drop signal to one or more output ports 214. Local clients nay be connected to output ports 214 and traffic sent to a particular output port 214 is destined for a local client associated with that particular output port 214. More particularly, WSS 212 switches selected wavelengths of the drop signal to selected output ports 214 while substantially rejecting all other wavelengths. For example, if the drop signal includes channels at wavelengths $\lambda_1$ to $\lambda_4$, WSS 212 may be operable to individually switch channels at wavelengths $\lambda_1$, $\lambda_2$, and $\lambda_4$ among output ports 214 while rejecting $\lambda_3$. For instances, WSS 212 may pass channels at wavelengths $\lambda_1$, $\lambda_2$, and $\lambda_4$ to output ports 214A, B, and C, respectively, or alternatively to output ports 214B, C, and A, respectively. WSS 212 may provide a different channel for each output port 214, but WSS 212 may alternatively drop different subbands of the drop signal to different output ports 214. A subband, as used herein, means a portion of the bandwidth of the network comprising a subset of the channels of the network. As an example only, one embodiment of WSS 212 may be constructed as described in U.S. Pat. No. 6,097,859. Alternatively, distributing element 204 may comprise a demultiplexer 222 (e.g., array waveguide grating) in place of WSS 212 as illustrated in FIG. 2B. In this alternative embodiment, demultiplexer 222 demultiplexes the drop signal into individual channels and passes a different wavelength to each output port 214 while blocking other channels from the drop signal. Any other suitable devices may be used instead of a WSS 212 or demultiplexer 222 for passing individual channels to output ports 214.

After the optical signal passes through in-line switch 202A and coupler 210, the optical signal passes through switches 202B and C (which are in an open state) to wavelength blocker 208. Wavelength blocker 208 is operable to reject traffic in particular channels while passing traffic in the remaining channels through wavelength blocker 208. Wavelength blocker 208 may be based on any suitable technology such as, for example, MEMS, gratings, liquid crystals, or any other suitable elements. In particular embodiments, wavelength blocker 208 includes a separate filter associated with each incoming channel. In such a case, each filter is configured either to forward (pass) an associated channel of the optical signal or to terminate (reject) the associated channel. For example, if traffic in a particular channel is to be added to optical ring 104 by combining element 206, then wavelength blocker 208 may block traffic in that to prevent interference with the traffic being added to ring 104 by combining element 206. The optical signal remaining after the wavelength blocker 208 passes through in-line switches 202D and E (which are in an open state) and in-line switch 202F passes the optical signal to add coupler 216 for adding channels received by combining element 206.

Combining element 206 receives traffic in one or more channels via input ports 218 and combines traffic in the one or more channels to generate an add signal. In particular embodiments, each input port 218 receives traffic in a different channel. Combining element 206 forwards the add signal to add coupler 216 via add lead 220. In the illustrated embodiment, combining element 206 comprises a WSS 212. Alternatively, combining element 206 comprises a multiplexer 224 (e.g., array waveguide grating) in place of WSS 212 as illustrated in FIG. 2C. In this alternative embodiment, multiplexer 224 multiplexes the channels received via input ports 218 into the add signal and passes the add signal to add coupler 216. Any other suitable devices may be used instead of a WSS 212 or multiplexer 224 for passing individual channels to output ports 214.

Add coupler 216 receives the add signal from combining element 206 and adds the add signal to the optical signal carried on ring 104. In particular, add coupler 216 receives the optical signal from in-line switch 202F via ingress lead 205 and the add signal from combining element 206 via add lead 217. After add coupler 216 adds the add signal to the optical signal, add coupler 216 passes the optical signal to in-line switch 202F via egress lead 203, which is then amplified by amplifier 210.

While FIG. 2A illustrates a single amplifier 210, node 102 may include a plurality of amplifiers 210 or no amplifiers. Amplifier 210 may comprise an Erbium-doped fiber amplifier (EDFA) or other suitable amplifier capable of receiving and amplifying an optical signal. To reduce the optical power variations in ring 104, amplifier 210 may use an automatic level control (ALC) function with wide input dynamic-range. Hence, amplifier 210 may deploy automatic gain control (AGC) to realize gain-flatness against input power variation, as well as variable optical attenuators (VOAs) to realize ALC function.

In one aspect of operation of node 102, an optical signal is received at node 102 and is passed to drop coupler 210 via in-line switch 202A (since switch is in the cross state). Drop coupler 210 makes two substantially identical copies of the optical signal. Drop coupler 210 drops one of the copies to WSS 212 which optically switches traffic in particular channels to output ports 214, and drop coupler 210 passes the other copy of the optical signal to ring 104 via in-line switch 202A. The optical signal then passes through in-line switches 202B and C (since they are in the open state) to wavelength blocker 208. Wavelength blocker 208 receives the optical signal and rejects traffic in particular channels, such as traffic in channels added by combining element 206, from the optical signal and passes the traffic in the remaining channels. The optical signal remaining after wavelength blocker 208 passes through in-line switches 202D and E (since they are in the open state) to in-line switch 202F. In-line switch 202F passes the optical signal to add coupler 216 for adding additional channels received by WSS 212 to the optical signal. WSS 212 receives channels at different wavelengths via input ports 218, combines the different channels to generate an add signal, and passes the add signal to add coupler 216 via add lead 220. Add coupler 216 adds the add signal to the optical signal and passes the optical signal to ring 104 via in-line switch 202F. Amplifier 210 then amplifies the optical signal before it is transmitted from node 102 over ring 104.

Figure 3:
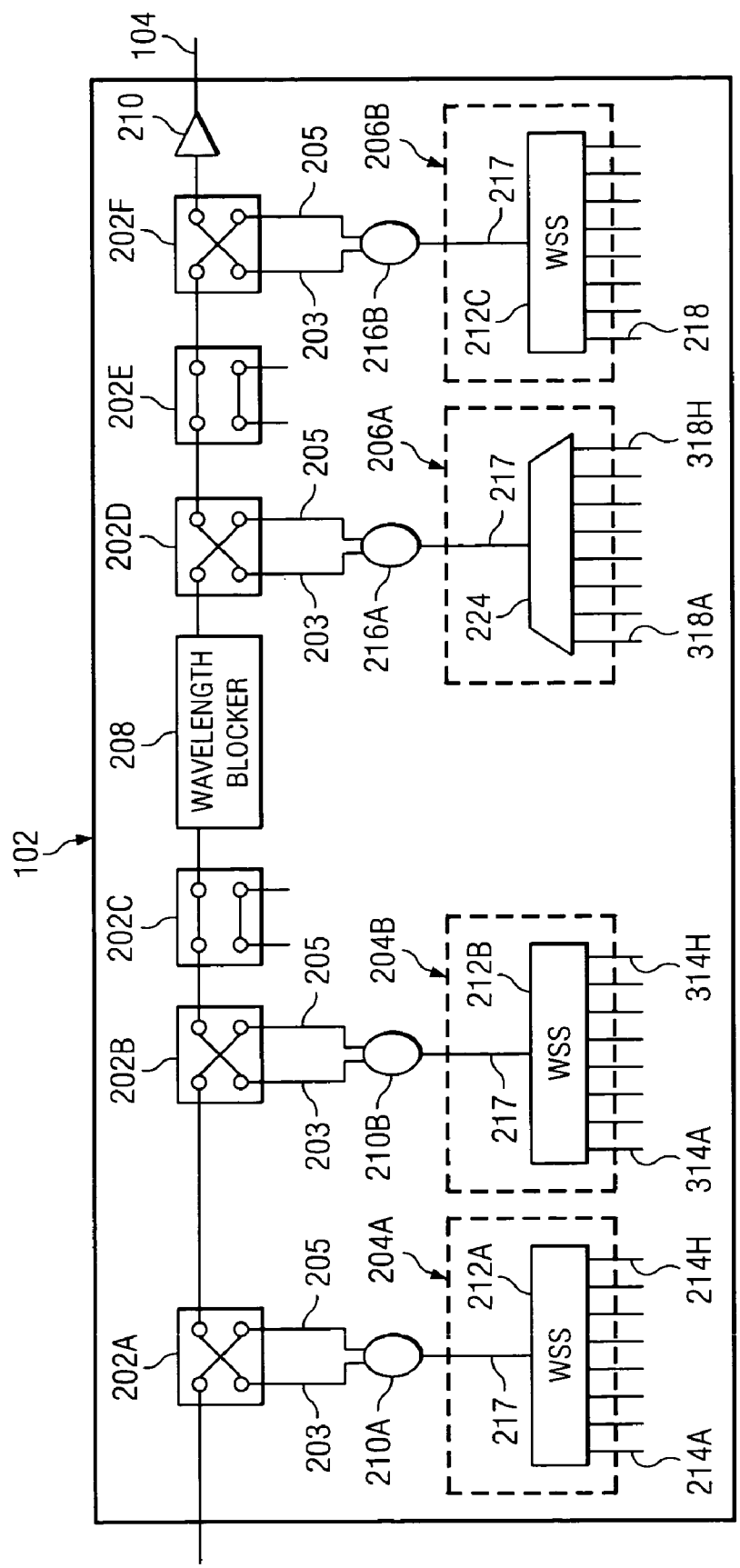
FIG. 3 is a block diagram illustrating details of a node of FIG. 1 including a plurality of distributing elements and combining elements in accordance with one embodiment of the present invention.

FIG. 3 illustrates a node 102 of FIG. 1 in accordance with another embodiment of the present invention. In particular, a plurality of distributing elements 204 and combining elements 206 are used to drop traffic from and add traffic to, respectively, the optical signal carried on ring 104. As a result, the number of channels dropped and/or added by node 102 may be modularly grown in response to the number of channels needing to be dropped and/or added by node 102 exceeding the currently available output ports 214 and/or input ports 218.

For example, the maximum number of channels that may be dropped by node 102 of FIG. 2A may be limited by the number of output ports 214 if each output port 214 of WSS 212 is associated with an individual channel. Similarly, the maximum number of individual wavelengths that may be added to ring 104 by node 102 may be limited by the number of input ports 218 if each input port 218 of WSS 212 is associated with an individual channel. In the case that the desired number of channels to be dropped and/or added to ring 104 by node 102 exceeds the number of available output ports 214 and/or input ports 218, respectively, additional distributing or combining elements may be installed to meet these requirements, as illustrated in FIG. 3.

Referring to FIG. 3, node 102 includes a plurality of in-line switches 202, a plurality of distributing elements 204, a plurality of drop couplers 210, a plurality of combining elements 206, and a plurality of add couplers 216. In-line switches 202A and B, which are in a cross state, are coupled to add couplers 210A and B, respectively, via ingress leads 205 and egress lead 203. Drop couplers 210A and B are also coupled to distributing elements 204A and B, respectively, via an associated drop lead 217. In-line switches 202D and F, which are in a cross state, are coupled to add couplers 206A and B, respectively, via ingress lead 205 and egress lead 204. In-line switches 202C and E are in an open state. Add couplers 216A and B are also coupled to combining elements 206A and B, respectively, via associated add leads 220. Thus, node 102 of FIG. 3 represents the node of FIG. 2 with the addition of coupler 210B and distributing element 204B coupled to in-line switch 202B and coupler 216A and combining element 206A coupled to in-line switch 202D. Distributing elements 204 and combining elements 206 may be based solely on wavelength-selective switches as in FIG. 2A, multiplexers/demultiplexers as in FIGS. 2B and C, a combination of such elements as in FIG. 3, or any other suitable optical elements.

In one aspect of operation of node 102, an optical signal is received at node 102 and is passed to drop coupler 210A via in-line switch 202A (since switch is in a cross state). For example, the optical signal may comprise a WDM signal including channels at wavelengths $\lambda_1$ to $\lambda_{40}$. Drop coupler 210A splits the optical signal into two substantially identical copies of the optical signal. Drop coupler 210A drops the optical signal to WSS 212A which optically switches individual channels of the optical signal to output ports 214 while rejecting all other wavelengths. Continuing with the example, WSS 212A switches channels at wavelengths $\lambda_1$ to $\lambda_8$ to output ports 214A to H, respectively, while rejecting wavelengths $\lambda_9$ to $\lambda_{40}$. Drop coupler 210A passes the optical signal to ring 104 via egress lead 203 and in-line switch 202A. In the example, since drop coupler 210A passes the optical signal to ring 104, the optical signal still comprises a WDM signal including wavelengths $\lambda_1$ to $\lambda_{40}$. In-line switch 202B then passes the optical signal carried on ring 104 to drop coupler 210B via ingress lead 205. Drop coupler 210B again splits the optical signal into two substantially identical copies of the optical signal. Drop coupler 210B drops the optical signal to WSS 212B which optically switches individual channels of the optical signal to output ports 314 while rejecting all other wavelengths. Returning to the example, WSS 212B switches channels at wavelengths $\lambda_9$ to $\lambda_{16}$ to output ports 314A to H, respectively, while rejecting $\lambda_1$ to $\lambda_8$ and $\lambda_{17}$ to $\lambda_{40}$. Drop coupler 210B passes the optical signal to ring 104 via egress lead 205 and in-line switch 202B. The optical signal then passes through in-line switch 202C (since the switch is in an open state) to wavelength blocker 208.

Wavelength blocker 208 receives the optical signal and rejects traffic in particular channels, such as traffic in channels added by combining element 206, from the optical signal and passes traffic in the remaining channels to in-line switch 202D. In particular embodiments, the channels added by combining elements 206 are the same channels dropped by distributing elements 204. In the example, wavelength blocker 208 rejects traffic at wavelengths $\lambda_1$ to $\lambda_{16}$ from the optical signal, and as a result, the remaining WDM signal includes traffic at wavelengths $\lambda_{17}$ to $\lambda_{40}$. In-line switch 202D, which is in a cross state, passes the optical signal to add coupler 216A for adding additional channels to the optical signal. Multiplexer 224 receives channels at different wavelengths via input ports 318 and multiplexes them into a first add signal. Returning to the example, multiplexer 224 receives channels at wavelengths $\lambda_1$ to $\lambda_8$ via input ports 318A to H, respectively, and multiplexes the channels into a first add signal. Multiplexer 224 passes the first add signal to add coupler 216A, which adds the first add signal to the optical signal and passes the optical signal to ring 104 via egress lead 203 and in-line switch 202D. In the example, the optical signal now includes the wavelengths $\lambda_1$ to $\lambda_8$ and $\lambda_{17}$ to $\lambda_{40}$. The optical signal then passes through in-line switch 202E (since the switch in an open state) to in-line switch 202F.

In-line switch 202F passes the optical signal to add coupler 216B for adding additional channels to the optical signal. WSS 212C receives traffic at particular channels via input ports 218 and combines the channels to generate a second add signal. In the example, WSS 212C receives channels at wavelengths $\lambda_9$ to $\lambda_{16}$ via input ports 218A to H, respectively, and combines the channels into a second add signal. WSS 212C passes the first add signal to add coupler 216B, which adds the second add signal to the optical signal and passes the optical signal to ring 104 via egress lead 203 and in-line switch 202F. In the example, the optical signal now includes the wavelengths $\lambda_1$ to $\lambda_{40}$. Amplifier 210 then amplifies the optical signal before it is transmitted from node 102 over ring 104.

FIG. 4 illustrates a node 102 of FIG. 1 in accordance with yet another embodiment of the present invention. In particular, a wavelength blocker 208 is coupled to ring 104 via an in-line switch 202D. As a result, node 102 as illustrated in FIG. 4 may initially be used as an in-line amplification site when all in-line switches 202 are in an open state and upgraded to an add/drop node by adding a distributing element 204, a combining element 206, and a wavelength blocker 208, as illustrated in FIG. 4.

Referring to FIG. 4, node 102 includes a plurality of in-line switches 202, a distributing element 204, a drop coupler 210, a combining element 206, an add coupler 216 and a wavelength blocker 208. In-line switches 202A, D, and G (since they are in a cross state) couple drop coupler 210, add coupler 216, and wavelength blocker 208 to ring 104, respectively, via associated ingress leads 205 and egress leads 203. Drop coupler 210 is also coupled to distributing element 204 via drop lead 217, and add coupler 216 is also coupled to combining element 206 via add lead 220. In-line switches 202B to F are in an open state. Node 102 as illustrated in FIG. 4 may be upgraded to a node adding additional distributing elements 204 and combining elements 206 as illustrated in FIG. 3.

In one aspect of operation of node 102, an optical signal is received at node 102 and is passed to drop coupler 210 via in-line switch 202A (since switch is in a cross state). Drop coupler 210 makes two substantially identical copies of the optical signal. Drop coupler 210 drops one of the copies to distributing element 204 which optically passes traffic in selected channels to output ports 214, and drop coupler 210 also passes the optical signal to ring 104 via an associated egress lead 203 and in-line switch 202A. The optical signal then passes through in-line switches 202B and C (since they are in an open state) to in-line switch 202D, which passes the optical signal to wavelength blocker 208 (since the switch is in a cross state). Wavelength blocker 208 receives the optical signal and rejects traffic in particular channels, such as traffic in channels added by combining element 206, from the optical signal and passes the remaining optical signal to ring 104 via egress lead 203 and in-line switch 202D. The optical signal remaining after wavelength blocker 208 passes through in-line switches 202E and F (since they are in an open state) to in-line switch 202G. In-line switch 202G passes the optical signal to add coupler 216 for adding additional channels received by combining element 206 to the optical signal. Combining element 206 receives channels at different wavelengths via input ports 218, combines the different channels to generate an add signal, and passes the add signal to add coupler 216 via add lead 220. Add coupler 216 adds the add signal to the optical signal and passes the optical signal to ring 104 via in-line switch 202G. Amplifier 210 then amplifies the optical signal before it is transmitted from node 102 over ring 104.

FIG. 5 illustrates a node 102 of FIG. 1 in accordance with another embodiment of the present invention. In particular, a distributing element 204 and a combining element 206 are directly coupled to in-line switches 202A and 202G, respectively. As a result, node 102 as illustrated in FIG. 5 provides a pay-as-you-grow scheme and reduces, eliminates, or minimizes the need for additional components such as, for example, a wavelength blocker 208, a drop coupler 210, and an add coupler 216.

Referring to FIG. 5, node 102 includes a plurality of in-line switches 202, a distributing element 204, and a combining element 206. In-line switches 202A and G (since they are in a cross state) couple distributing element 204 and combining element 206 to ring 104, respectively. Distributing element 204 is coupled to in-line switch 202A via ingress lead 205 and output port lead 214A. Combining element 206 is coupled to in-line switch 202G via input port lead 218H and egress lead 203. In-line switches 202B to 202F are in an open state. Node 102 may be upgraded with additional distributing element 204 and/or combining element 206 applied to switches 202B-F.

In one aspect of operation of node 102, an optical signal is received at node 102 and is passed to distributing element 204 via in-line switch 202A (since switch is in a cross state). Distributing element 204 optically passes traffic in selected channels to one or more of output ports 214B through 214H and may pass a subset of the remaining channels to ring 104 via output port 214A and in-line switch 202A. The traffic passed back to ring 104 from port 214A of distributing element 204 passes through in-line switches 202B through 202F (since they are in an open to state) to in-line switch 202G. In-line switch 202G passes the optical signal to combining element 206 via input port 218H for adding additional channels received by input ports 218A to 218G to the optical signal. Combining element 206 receives channels at different wavelengths via input ports 218A through 218G and the optical signal via input port 218H, combines the different channels into one optical signal, and passes the combined signal to ring 104 via egress lead 203 and in-line switch 202G.

Amplifier 210 then amplifies the optical signal before it transmitted from node 102 over ring 104.

FIG. 6 illustrates a node 102 of FIG. 1 in accordance with another embodiment of the present invention. In particular, a cascade of distributing elements 204 are used to drop traffic at selected channels transmitted on optical ring 104. In addition, a cascade of combining elements 206 are used to add traffic at selected channels to optical ring 104.

Referring to FIG. 6, node 102 includes a plurality of distributing elements 204, a plurality of combining elements 206, a wavelength blocker, a drop coupler 210, an add coupler 216, and an amplifier. Drop coupler 210 is coupled to the plurality of distributing elements 204 via ingress lead 205, and add coupler is coupled to the plurality of combining elements 206 via egress lead 203. In particular, distributing element 204 and combining element 206 are wavelength-selective switches. Wavelength blocker 208 is coupled to optical ring 104.

In one aspect of operation of node 102, an optical signal is received at node 102 and is passed to drop coupler 210. Drop coupler 210 drops a copy of the optical signal to distributing element 204A via ingress lead 205. Distributing element 204A optically passes particular channels of subbands to each of a number of distributing elements 204B. A subband, as used herein, means a portion of the bandwidth of the network comprising a subset of the channels of the network. Distributing element 204A is configured as desired such that selected channels of subbands of the received optical signal may be output at selected output ports of distributing elements 204A, which are in turn coupled to particular input ports of distributing elements 204B. As a result, each distributing element 204B receives traffic at one or more channels, and each distributing element 204B optically passes traffic in the associated channels to output ports 214.

Drop coupler 210 aso passes a copy of the optical signal transmitted on ring 104 to wavelength blocker 208. Wavelength blocker 208 receives the optical signal and rejects traffic in particular wavelengths, such as traffic being added by the plurality of combining elements 206, from the optical signal and passes the remaining traffic to add coupler 216. Each combining element 206B receives traffic at particular channels via their associated input ports 218 and combines the channels to generate an associated combined signal. Each combined signal generated by an associated combining element 206B is passed to combining element 206A via input ports 218 of combining element 206B. Combining element 206A receives the combined signals and combines the signals to generate an add signal. Combining element 206A then passes the add signal to add coupler 216 via egress lead 203. Add coupler 216 adds the add signal to the optical signal transmitted on ring 104. Amplifier 210 then amplifies the optical signal before it is transmitted from node 102 over ring 104.

FIG. 7 illustrates one embodiment of a node 102 implementing cross-connects for providing sub-lambda granularity. In particular, node 102 uses cross-connects (XCs) 502 to switch traffic from one or more input ports of each XC 502 to one or more output ports of the XCs 502. As a result of such switching, XCs 502 may provide sub-lambda granularity.

Referring to FIG. 5, node 102 includes a plurality of in-line switches 202, a distributing element 204, a drop coupler 210, an combining element 206, an add coupler 216 and a wavelength blocker 208. In-line switches 202A, D, and G in a cross state couple drop coupler 210, add coupler 216, and wavelength blocker 208 to ring 104, respectively, via an associated ingress lead 205 and egress lead 203. Drop coupler 210 is also coupled to distributing element 204 via drop lead 217, and add coupler 216 is also coupled to combining element 206 via add lead 220. Drop coupler 210 is coupled to XC 502A via output ports 214, and add coupler 216 is coupled to XC 502B via input ports 218. In-line switches 202B, C, E and F are in an open state.

In the illustrated embodiment, XCs 502 comprises digital cross connects. Hence, optical-to-electrical (OE) and electrical-to-optical (EO) conversion may be required prior to cross-connecting traffic received at the XCs 502. If required, optical receivers may be coupled to output ports 214 and add leads 506 to perform OE conversion of traffic in ingress channels, and optical transmitters may be coupled to drop leads 504 and input ports 218 to perform EO conversion of traffic in egress channels. XCs 502 are operable to switch traffic from each of the input ports to one or more output ports and thus provide sub-lambda granularity. As a result, traffic carried on a single channel, which is received via a single output port 214 (or single ingress add lead 506), may be distributed over one or more egress drop leads 504 (or over one or more of input ports 218). XCs 502 may pass the traffic from each drop lead 504 to another optical ring and/or the same ring 104 and in the same or different channels. For example, some or all drop leads may be coupled to another ring, to add leads 506 of XC 502B for adding back to ring 104 (for example, in another channel than the channel it was received by XC 502A), or any other suitable components or devices.

In particular embodiments, each egress drop lead 504 passes traffic to be communicated in a channel different from the channels associated with the other egress drop leads 504. For example, XC 502A may receive traffic containing information blocks A, B, and C received via a channel at wavelength $\lambda_1$ via output port 214A and switch blocks A, B, and C to egress drop leads 504A, G, and N, respectively, where drop leads 504 A, G, and N are associated with channels at wavelengths $\lambda_3$, $\lambda_6$, and $\lambda_{10}$, respectively. Similarly, each input port 218, in particular embodiments, receives traffic associated with a channel different from the channels associated with the other input ports 218. For example, XC 502B may receive information blocks A, B, and C associated with wavelength $\lambda_1$ via ingress add lead 506A and switch blocks A, B, and C to input ports 218A, D, and H, respectively, where input ports 218A, D, and H are associated with channels at wavelengths $\lambda_3$, $\lambda_6$, and $\lambda_{10}$, respectively. In other embodiments, traffic carried on multiple channels, which is received via multiple output ports 214 (or multiple ingress add leads 506), may be switched to and combined at a single egress drop lead 504 (or a single input port 218).

In one aspect of operation of node 102, an optical signal is received by node 102 and is passed to drop coupler 210 via in-line switch 202A (since the switch is in a cross state). Drop coupler 210 splits the optical signal into two substantially identical copies of the optical signal. After which, drop coupler 210 drops the optical signal to distributing element 204 which optically passes traffic in selected channels of the optical signal to XC 502A via output ports 214 while substantially rejecting traffic in all other channels. XC 502A switches traffic from one output port 214 to one or more egress drop leads 504. Drop coupler also passes the optical signal to ring 104 via an associated egress lead 203 and in-line switch 202A. The optical signal then passes through in-line switches 202B and C (since the switches are in an open state) to in-line switch 202D. In-line switch 202D passes the optical signal to wavelength blocker 208, which rejects traffic in channels added by combining element 206. Wavelength blocker 208 passes traffic in the remaining channels to ring 104 via an associated egress lead 203 and in-line switch 202D. The optical signal then passes through in-line switches 202E and F (since the switches are in an open state) to in-line switch 202G. In-line switch 202G passes the optical signal to add coupler 216 for adding traffic received by XC 502B. XC 502B receives traffic via ingress add leads 506 (for example, traffic from another ring or from XC 502A) and switches traffic from one ingress add lead 506 to one or more input ports 218. The resulting channels pass to combining element 206 via input ports 218. Combining element 206 combines the individual channels into an add signal and passes the add signal to add coupler 216 via add lead 220. Add coupler adds the add signal to the optical signal and pass the optical signal to ring 104 via an associated egress lead 203 and in-line switch 202G. Amplifier 210 then amplifies the optical signal before it is transmitted from node 102 over ring 104.

Figure 8:
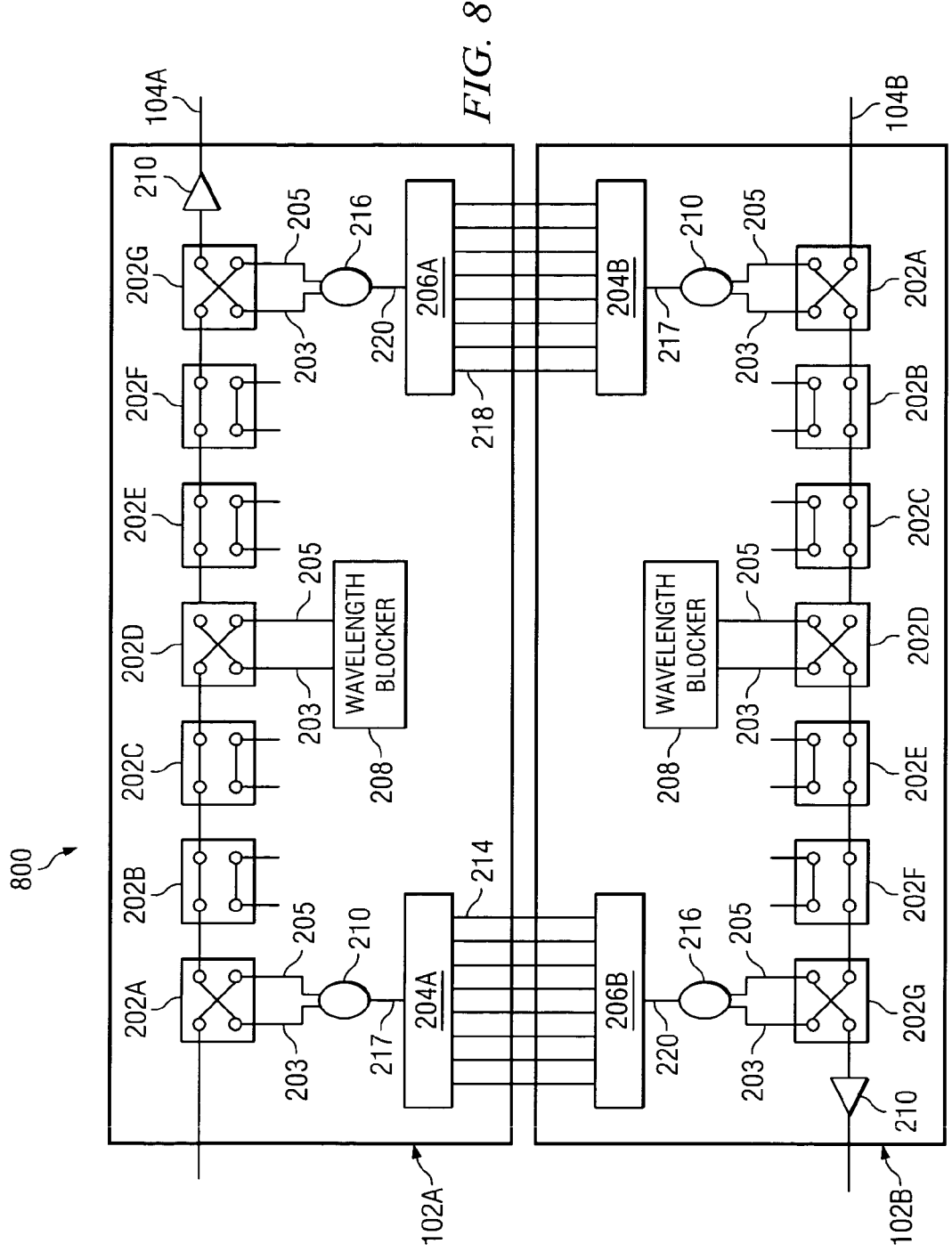
FIG. 8 is a block diagram illustrating details of a multi-ring system in accordance with yet another embodiment of the present invention.

FIG. 8 illustrates a multi-ring system 800 in accordance with one embodiment of the present invention. In particular, node 102A of ring 104A is coupled to node 102B of ring 104B to provide a multi-hub ring architecture. As a result, inter-network traffic may be passed via output ports 214 and input ports 218 between optical rings 104A and 104B.

Referring to FIG. 8, multi-ring system 800 comprise two nodes 102A and 102B as illustrated in FIG. 4, so components with similar numerals perform similar functions except, in part, output ports 214 and input ports 218. Output ports 214 and input ports 218 couple nodes 102A and 102B passing traffic from 102A to 102B and traffic from 102B to 102A, respectively. Hence, output ports 214 serve as inputs to combining element 206B of node 102B, and input ports 218 serve as outputs for distributing element 204B of node 102B.

In one aspect of operation, a first optical signal is received at node 102A and is passed to drop coupler 210 via in-line switch 202A (since switch is in a cross state). Drop coupler 210 makes two substantially identical copies of the optical signal. Drop coupler 210 drops one of the copies to distributing element 204A which optically passes traffic in selected channels to output ports 214, and drop coupler 210 also passes the optical signal to ring 104A via an associated egress lead 203 and in-line switch 202A. Output ports 214 pass the selected channels to combining element 206B of node 102B for adding to a second optical ring 104B. Combining element 206B combines the selected channel into a first combined signal and passes the first combined signal to add coupler 216 of node 102B for adding the combined signal to a second optical signal transmitted on ring 104B.

Returning to node 102A, the first optical signal then passes through in-line switches 202B and C (since they are in an open state) to in-line switch 202D, which passes the first optical signal to wavelength blocker 208 (since the switch is in a cross state). Wavelength blocker 208 receives the first optical signal and rejects traffic in particular channels, such as traffic in channels added by combining element 206A, from the first optical signal and passes the remaining optical signal to ring 104A via egress lead 203 and in-line switch 202D. The first optical signal remaining after wavelength blocker 208 passes through in-line switches 202E and F (since they are in an open state) to in-line switch 202G. In-line switch 202G passes the optical signal to add coupler 216 for adding additional channels received by combining element 206A to the optical signal. Combining element 206 receives channels at different wavelengths via input ports 218 from distributing element 204 of node 102B, combines the different channels to generate an add signal, and passes the add signal to add coupler 216 via add lead 220. Add coupler 216 adds the add signal to the first optical signal and passes the first optical signal to ring 104 via in-line switch 202G. Amplifier 210 then amplifies the first optical signal before it is transmitted from node 102A over ring 104A.

Although the present invention has been described in detail, various changes and modifications may be suggested to one skilled in the art. It is intended that the present invention encompass such changes and modifications as falling within the scope of the appended claims.

What is claimed is:

1. A node for an optical network, comprising:
a plurality of in-line switches connected to an optical ring and operable in a first state to both pass an optical signal received from the optical ring to an associated coupler and pass an optical signal received from the associated coupler to the optical ring, the optical signal carrying traffic in a plurality of channels;
a drop coupler coupled to a first in-line switch and operable to receive an optical signal from the in-line switch where the switch is in the first state, pass a first copy of the optical signal back to the in-line switch for passing to the optical ring, and drop a second copy of the optical signal to a distributing element;
the distributing element operable to receive the second copy and pass traffic in one or more channels of the second copy;
a filter operable to receive the first copy via the optical ring from the first in-line switch and to reject one or more channels of the first copy to generate a passthrough signal;
a combining element operable to receive traffic in one or more channels to be added to the optical ring and to combine the received traffic to generate an add signal; and
an add coupler coupled to a second in-line switch and operable to receive the passthrough signal from the second in-line switch when the switch is in the first state, add the add signal to the passthrough signal to generate a combined signal, and pass the combined signal to the second in-line switch for passing to the optical ring.

2. The node of claim 1, wherein the one or more rejected channels comprise the one or more channels in which traffic is added by the combining element.

3. The node of claim 1, wherein the distributing element comprises a demultiplexer.

4. The node of claim 1, wherein the distributing element comprises a wavelength-selective switch.

5. The node of claim 1, wherein the combining element comprises a multiplexer.

6. The node of claim 1, wherein the combining element comprises a wavelength-selective switch.

7. The node of claim 1, wherein the filter comprises a wavelength blocker.

8. The node of claim 1, further comprising a third in-line switch coupled to the optical ring and the filter and operable to both pass the first copy from the optical ring to the filter and to pass the passthrough signal received from the filter to the optical ring when in the first state.

9. The node of claim 1, further comprising a cross connect coupled to the distributing element, the cross connect comprising a plurality of input ports for receiving the traffic passed by the distributing element and a plurality of output ports and operable to cross connect traffic from one or more input ports to one or more output ports.

10. The node of claim 1, wherein the combining element comprises a first combining element, the optical ring comprising a first optical ring, the distributing element operable to pass at least one of the one or more channels to second combining element associated with a second optical ring.

11. The node of claim 1, wherein the distributing element comprises a first distributing element, the optical ring comprising a first optical ring, the combining element operable to receive traffic in at least one channel from a second distributing element associated with a second optical ring.

12. The node of claim 9, wherein the cross connect comprises a first cross connect, further comprising a second cross connect coupled to the combining element, the first cross connect operable to pass traffic in at least one channel to the second cross connect.

13. The node of claim 1, further comprising a fourth in-line switch operable in a second state to pass through an optical signal.

14. An optical network, comprising:
an optical ring; and
a plurality of nodes, each node comprising:
 a plurality of in-line switches connected to an optical ring and operable in a first state to both pass an optical signal received from the optical ring to an associated coupler and pass an optical signal received from the associated coupler to the optical ring, the optical signal carrying traffic in a plurality of channels;
 a drop coupler coupled to a first in-line switch and operable to receive an optical signal from the in-line switch where the switch is in the first state, pass a first copy of the optical signal back to the in-line switch for passing to the optical ring, and drop a second copy of the optical signal to a distributing element;
 the distributing element operable to receive the second copy and pass traffic in one or more channels of the second copy;
 a filter operable to receive the first copy via the optical ring from the first in-line switch and to reject one or more channels of the first copy to generate a passthrough signal;
 a combining element operable to receive traffic in one or more channels to be added to the optical ring and to combine the received traffic to generate an add signal; and
 an add coupler coupled to a second in-line switch and operable to receive the passthrough signal from the second in-line switch when the switch is in the first state, add the add signal to the passthrough signal to generate a combined signal, and pass the combined signal to the second in-line switch for passing to the optical ring.

15. The optical network of claim 14, wherein the one or more rejected channels comprise the one or more channels in which traffic is added by the combining element.

16. The optical network of claim 14, wherein the distributing element comprises a demultiplexer.

17. The optical network of claim 14, wherein the distributing element comprises a wavelength selective switch.

18. The optical network of claim 14, wherein the combining element comprises a multiplexer.

19. The optical network of claim 14, wherein the combining element comprises a wavelength-selective switch.

20. The optical network of claim 14, wherein the filter comprises a wavelength blocker.

21. The optical network of claim 14, the nodes further comprising a third in-line switch coupled to the optical ring and the filter and operable to both pass the first copy from the optical ring to the filter and to pass the passthrough signal received from the filter to the optical ring in the first state when in the first state.

22. The optical network of claim 14, the nodes further comprising a cross connect coupled to the distributing element, the cross connect comprising a plurality of input ports for receiving the traffic passed by the distributing element and a plurality of output ports and operable to cross connect traffic from one or more input ports to one or more output ports.

23. The optical network of claim 14, the nodes further comprising a fourth in-line switch operable in a second state to pass through an optical signal.

24. The optical network of claim 14, wherein the combining element comprises a first combining element, the optical ring comprising a first optical ring, the distributing element operable to pass at least one of the one or more channels to second combining element associated with a second optical ring.

25. The optical network of claim 14, wherein the distributing element comprises a first distributing element, the optical ring comprising a first optical ring, the combining element operable to receive traffic in at least one channel from a second distributing element associated with a second optical ring.

26. The optical network of claim 22, wherein the cross connect comprises a first cross connect, the nodes further comprising a second cross connect coupled to the combining element, the first cross connect operable to pass traffic in at least one channel to the second cross connect.

\* \* \* \* \*